United States Patent Office 3,067,598
Patented Dec. 11, 1962

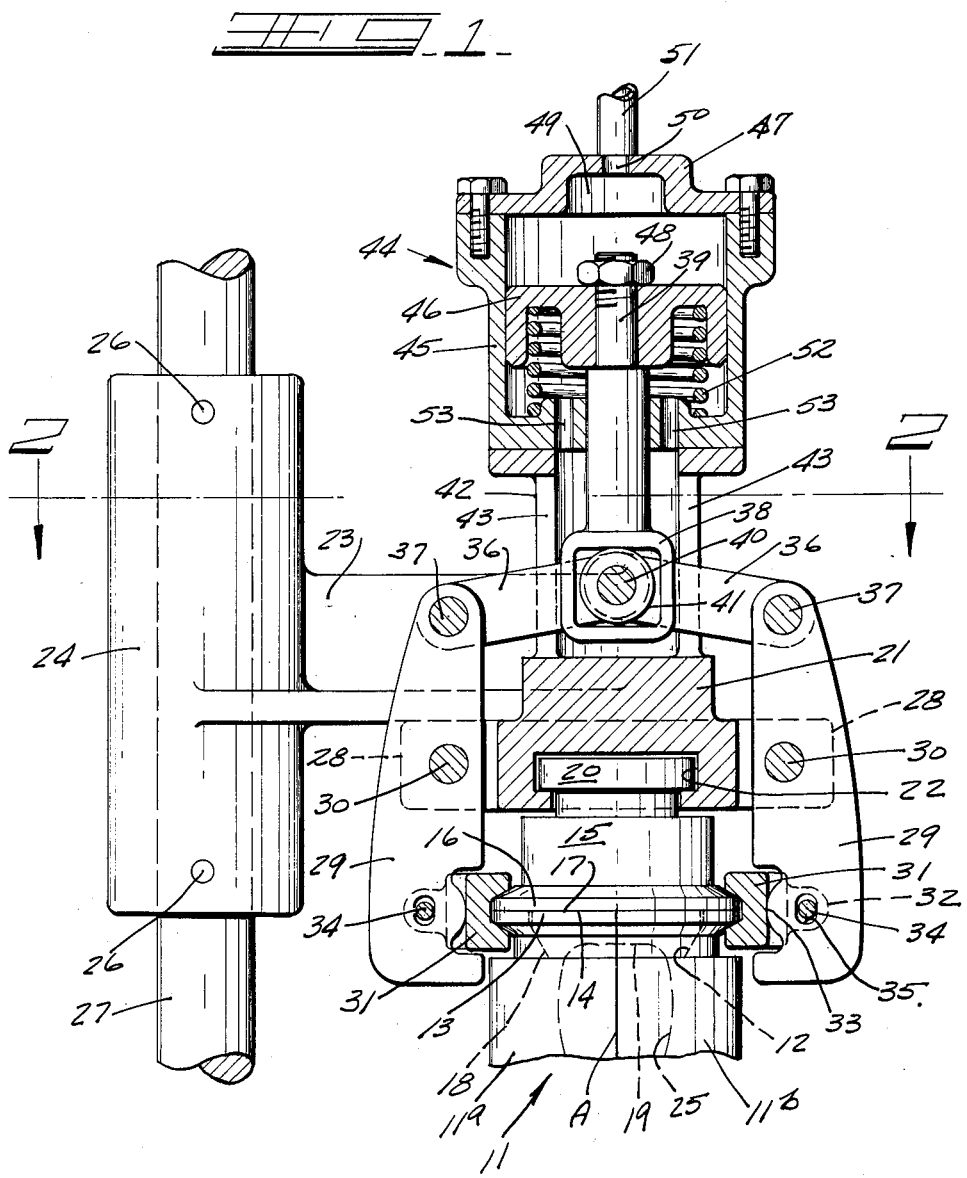

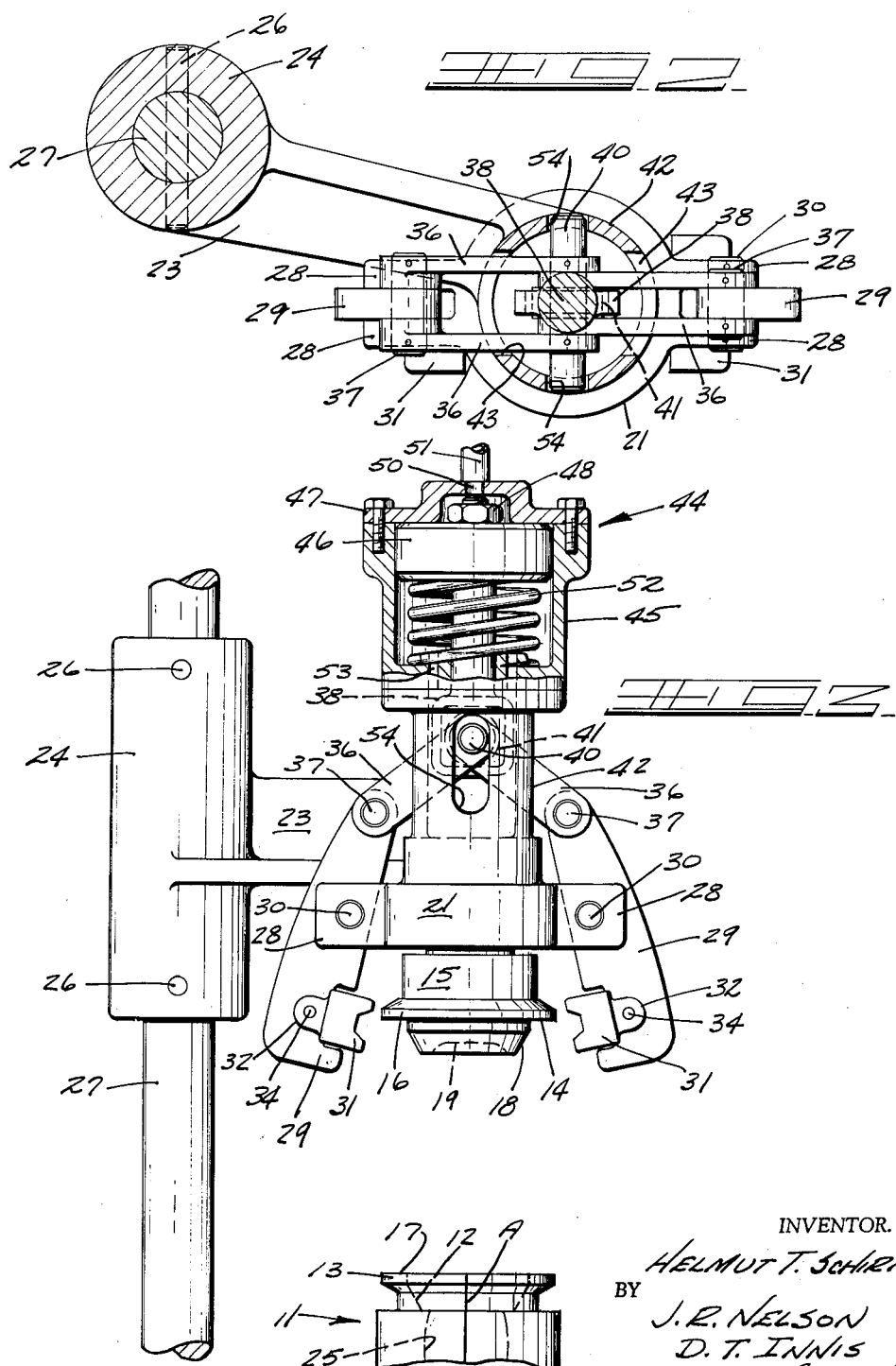

3,067,598
CLAMPING MECHANISM FOR GLASS MOLD
Helmut T. Schirm, Toledo, Ohio, assignor to Owens-Illinois Glass Company, a corporation of Ohio
Filed Mar. 28, 1960, Ser. No. 18,071
4 Claims. (Cl. 65—360)

The present invention relates to improvements in the blank mold assembly of a glass forming mechanism used for forming a glass parison, which is comprised of a plurality of components that includes a blank body mold and cooperating baffle; and, more particularly, to a clamp mechanism for clamping the components tightly together in an operating glass molding position. The clamp device of the present invention is adapted to be mounted for carriage with the baffle and clamps the mold and baffle tightly together when they are in glass molding position.

In glass forming machines presently employed, it is common practice to employ a blank mold which is disposed with the axis of its cavity vertical and open at opposite axial ends. A pair of cooperating neck rings or molds are manipulated to be adjacent the lowermost end opening of the mold, and charges of molten glass in the form of glass gobs are loaded to the mechanism through the open upper end of the blank mold. After the glass charge is loaded, the open upper end of the mold is closed by the baffle. Thus, with the mold charged with hot glass and the baffle seated to close the upper end of the mold, the mold components are arranged in their glass molding position. A plunger is registered with the neck rings and operated in a reciprocating fashion axially of the neck rings into and out of the blank mold cavity through the lower end opening of the overlying blank mold. The plunger may take various forms which identify it with various known processes for manufacture of containers by machine.

In the blow-and-blow type machine, the plunger is relatively short and is inserted through the neck to form the mouth opening of the container at the portion formed in the neck mold, and a fluid, such as pressurized air, is introduced axially through the plunger to blow out the parison to its shape in the blank mold.

In the press-and-blow type machine, the plunger is longer and is inserted through the neck to form the mouth opening of the container and press the parison to its shape in the blank mold. These latter plungers may take one of two general forms used for making either wide mouth containers or narrow neck containers. It follows that, in physical shape, the wide mouth type plunger is of a greater diameter than the narrow neck type.

It is axiomatic, therefore, that, of the types of forming operations just outlined, varying pressing forces result within and on the blank mold during forming the charge of glass to parison shape. These forces exert themselves in more than one direction. In this connection, speed of operation of the machine also introduces a variable in these forces. Hence, the mechanism necessary to hold the various parts of the blank mold assembly in operating relationship during forming the parison becomes an important factor in the limitations of operation of a particular machine.

In reference specifically to the plural mold components of the arrangements mentioned, certain machines employ split blank body molds in combination with a baffle, and other machines employ a one-piece blank body mold in combination with a baffle. In the former, a mold closing device is employed to close and hold the halves of the split mold closed during the parison forming operation. The baffle in either case is fastened to a carriage member that is operated to move the baffle between a remote out-of-the-way position into a seated operating position closing the upper end opening of the mold. In its operating position, the baffle is held in its seating relationship by a baffle hold-down device in the form of a cylinder motor and baffle arm. The cylinder of this device is the same cylinder motor mechanism employed to bring the baffle into alignment and onto its seat on the open upper end of the mold. The prior devices have disadvantages in that, under high pressing forces, the baffle tends to be lifted, and the cylinder mechanism must be unduly large in relation to the requirements of its functions in transporting the baffle. On the other hand, cylinder motors of adequate size to merely transport the baffle do not provide adequate hold-down pressure to seat the baffle under high speed operation or counteract the high pressing forces exerted within the mold by the plunger operation.

It is, accordingly, an object of the invention to provide a baffle clamp that will clamp the baffle and the mold together during plunger operation, and overcome these disadvantages in the prior structures, and, at the same time, provide high clamping pressures.

An important object of the invention also resides in the provision of a clamping device for a plural component glass mold assembly which is actuated in the forming operation of the machine to clamp these components tightly together in an operative position for forming an article of glass therein, and thereby prevent the glass from being squeezed out into the joints between these components of the assembly.

A further object of the invention is the provision of a new baffle clamp mechanism that is of simple construction and readily adaptable for use with a number of existing glass forming machines.

A still further object of the invention is to provide a clamping device mounted for carriage with the baffle, and brought to clamp the baffle and the mold together after the former is seated on the latter, and prevent heavy seams or baffle marks on the glass article through application of a high degree of clamping pressure, as needed, thus preventing separation of the mold parts when forces are applied to form the parison in the mold.

The specific nature of this invention, as well as other objects and advantages thereof, will become apparent to those skilled in the art from the following detailed description, taken in conjunction with the annexed sheets of drawings, on which, by way of preferred example only, is illustrated an embodiment of this invention.

In the drawings:

FIG. 1 is a partial sectional elevational view of a split blank mold assembly showing the present invention in operation, clamping a seated baffle tightly onto the upper end of the closed split mold and clamping the upper part of the mold, thereby biasing the opening of the split mold. Also shown is the common carriage for the baffle and the clamping device.

FIG. 2 is a sectional plan view taken along line 2—2 of FIG. 1.

FIG. 3 is a sectional elevational view of the parts on FIG. 1, showing the baffle and clamping device moved to a remote out-of-the-way position by the carriage with the clamp opened.

Referring to the drawings, a blank mold 11 is shown as comprised of a pair of complementary mold halves 11a and 11b which are mounted on means (not shown) for moving them toward and away from each other so that, when closed as shown on the drawings, their interfaces coincide on a mold parting line A. Alternatively, the blank mold may be of one-piece construction, thus eliminating the mold seam at the parting line A, but, aside from this just-mentioned difference, the one-piece blank mold would be similar to the split blank mold shown on FIGS. 1 and 3. Accordingly, so that the drawings are not unduly multiplied, the one-piece blank mold is not illustrated specifically on the drawings. In either the split mold or one-piece mold, an interior cavity 25 is provided and is open at the top and bottom ends. The top opening of the mold forms an annular baffle seat match 12. The upper ends of the mold halves 11a and 11b are provided with complementary annular bosses 13 having a common downwardly and inwardly tapering surface and an upper flat baffle seat surface 14.

A baffle 15 is shown on FIG. 1 closing the upper end opening of the mold cavity 25. The baffle includes an annular boss 16 corresponding to boss 13 on the mold and has an upwardly and inwardly tapering surface and a lower flat baffle seat surface 17. The two bosses 13 and 16, when juxtapositioned, form annular outwardly projecting clamping surfaces that form a generally wedge-shaped boss. Inwardly of the baffle seat 17, the baffle has a projection that provides a closure part for the mold opening. This provides a baffle seat matching surface 18 that corresponds to the mold seat match 12. The lower end of the baffle has a contoured molding surface 19 adapted to align on the mold cavity and form the one end of the parison disposed opposite the container neck (not shown). The upper end of baffle 15 has a male joint 20 of a bayonet-type connector for attaching the baffle on a baffle holder 21. A matching female joint 22 is provided at the lower end of the baffle holder 21.

The baffle holder 21 is an integral part of a carriage which comprises baffle arm 23 and integral boss 24 pin-connected at 26 onto a vertical piston rod 27. The rod 27 is attached as a part of a cylinder motor (not shown) that is operated through a raising and lowering movement and a coincident swinging movement for bringing the baffle between a raised and remote position (FIG. 3) and a seated relationship on the mold seat match 12, the latter being the glass molding position of the various mold components as shown on FIG. 1. The baffle holder 21 has oppositely disposed pairs of ears 28 that form a yoke therebetween. These ears 28 are disposed on opposite sides of the mold seam or parting line A. A pair of clamp members, as toggle arms 29, are pivotally mounted on the holder 21 within these yokes by pivot pins 30. Each arm 29 has a clamping shoe 31 mounted at its lower end. The shoes correspond to the wedge-shaped clamping surface of bosses 13 and 16. The mounting for the shoes 31 on their arms 29 permits limited rocking movement as well as a limited vertical movement to enable the clamps 31 to adjust themselves on their closing movement to the annular bosses 13 and 16. This mounting is shown as comprising a yoked mounting bracket 32 that fits about arm 29. The lower portion of arm 29 has a convex bearing surface 33. The shoe 31 is pin-connected at 34 through a vertically elongated slot 35 in the arm 29. The shoe 31 may thus rock a limited amount about its pivot 34 guided along the bearing surface 33, and may slide a limited amount vertically through the pin 34, slot 35 connection on the arm 29.

The upper ends of the toggle arms 29 are connected to pairs of toggle links 36 (FIG. 2) by pins 37. The links 36 are commonly connected on a piston rod yoke 38 of a piston rod 39 by a connecting pin 40. The links are spaced apart on the pin 40 by a journalled roller 41. The yoke 38 fits in a vertical yoke guide casting 42 that is integrally connected to the upper part of baffle holder 21. The casting 42 has opposite vertical slots 43 to accommodate up and down movement of the toggle links 36. As may be seen on FIG. 3, vertical slots 54 are provided to accommodate up and down movement of the pin 40 along the yoke guide casting 42.

Mounted at the top part of the casting 42 is a single acting fluid-operated cylinder motor 44. Motor 44 includes its cylinder 45, piston 46, and cylinder head 47. The piston rod 39 is attached to the piston 46 by nut 48. The cylinder head 47 is formed with a dome 49 to provide head clearance for the nut 48. Dome 49 also includes the inlet and exhaust port 50 connected to pipe 51. Pipe 51 is connected to a suitable valve (not shown) for operating the motor in reciprocating fashion, as desired, by alternatively connecting the pipe to a source of fluid, such as air, under pressure, or connecting it to exhaust. Thus, as the cylinder 45 is supplied by a source of fluid under pressure, such as may be available, the piston 46 is forced downwardly or toward the baffle holder 21, causing the toggle links 36 to extend laterally outwardly and thereby pivot the toggle arms 29 in opposite directions to move the clamping shoes 31 toward each other and into engagement with the bosses 13 and 16 of the mold and baffle, respectively, as shown on FIG. 1. Since the shoes are brought toward clamping engagement in an arcuate path, their mounting on the arm 29, described above, allows them to adjust in clamping so that they clamp evenly and firmly on the bosses 13 and 16. When the shoes 31 are clamped, as mentioned, they tightly clamp the baffle onto its mold seat and also clamp the upper end of the mold halves tightly closed.

When the cylinder is connected to exhaust, a compressed piston return spring 52 at the under side of piston 46 drives the piston upwardly or away from the baffle holder 21, causing the toggle links 36 to pull laterally inwardly and thereby pivot the toggle arms 29 in opposite directions to move the clamping shoes 31 away from each other and release their clamp on the bosses 13 and 16. The release position is shown on FIG. 3.

The piston 46 of motor 44 is provided with the necessary and usual ring seals (not shown) between it and the cylinder walls. The lower end of the cylinder 45 is also provided with vents 53 to retain the cylinder portion below the piston 46 at atmospheric pressure at all times.

Having described a preferred embodiment of the invention, an example of the practical adaptation of the foregoing into operation on a glass forming machine is given by the following.

Let rod 27 be the piston rod of the baffle cylinder motor on the well-known Hartford-Empire IS (individual section) machine that operates according to the disclosure in U.S. Patent No. 2,508,890, issued to G. E. Rowe. In such machine, its operation is by the control of a timing device to time the lowering and seating of the baffle on the blank mold in sequence with closing and loading that mold with glass. The clamp means of the present invention is then operated by means of the above motor 44 and linkages 36 which may be activated for clamping movement under control of the machine timing device and in proper sequence after seating the baffle but before driving the pressing plunger of the blank mold assembly into the mold to shape the glass to a parison. Likewise, after pressing of the parison is completed, motor 44 will be inactivated by exhaust of pressure fluid, and the clamp released as aforementioned, whereupon, the baffle carriage is operated in the usual manner to take the baffle to a remote out-of-the-way position, and the blank mold opened in the standard manner. Thus, the invention is adaptable to existing glass forming machinery.

It will, of course, be understood that various details of construction may be modified through a wide range without departing from the principles of this invention and it is, therefore, not the purpose to limit the patent granted hereon otherwise than necessitated by the scope of the appended claims.

I claim:

1. In a blank mold assembly of a glass forming mechanism, including a blank mold defining a cavity having an open end, a baffle for closing said open end, and a carriage supporting the baffle, said carriage being movable to one position to seat the baffle on the mold thereby to close the open end of the mold and movable to a second position to uncover the mold, said open end of the mold and said baffle having matching seat surfaces and annular bosses extending radially outwardly from said seat surfaces, the improvement which comprises a toggle mechanism including opposed arms pivotally mounted on the carrige on diametrically opposite sides of the baffle, a shoe mounted on one end of each of said arms, each of said shoes having a pair of spaced portions extending radially inwardly, said portions being adapted simultaneously to enclose and clamp together both of the bosses on the mold and the baffle when said baffle is seated on the mold, and means connected to the other end of each of said arms for moving said shoes toward and away from the bosses to effect clamping and unclamping of the bosses.

2. In the mechanism defined in claim 1, wherein each of said shoes is pivoted to its toggle arm by means permitting limited vertical and rocking movement of the shoe with respect to said arm.

3. The mechanism defined in claim 1, wherein the means for pivoting the arms comprise toggle links, each pivotally connected at one end to one of the arms at its said other end, a reciprocable member pivotally connected to each of said toggle links at its other end and arranged for movement between the arms in a direction along the plane of said arms and toward and away from said baffle, and means for reciprocating said member, whereby its movement toward the baffle actuates the toggle arms to enclose and clamp the bosses of the baffle and mold and movement away from the baffle actuates the toggle arms in the opposite direction.

4. In the mechanism defined in claim 3, wherein said mold comprises a partible blank body having complementary mold halves, each having a boss extending radially outwardly from the matching surfaces, said toggle mechanism and said shoes being disposed on opposite sides of the parting line of said mold and being adapted to hold the mold halves and the baffle in mold closing relation.

References Cited in the file of this patent

UNITED STATES PATENTS

| | | |
|---|---|---|
| 1,607,254 | Fantz | Nov. 16, 1926 |
| 1,836,646 | Crile | Dec. 15, 1931 |
| 2,111,296 | O'Neill | Mar. 15, 1938 |
| 2,496,016 | Nelson | Jan. 31, 1950 |
| 2,818,684 | Lauck | Jan. 7, 1958 |
| 2,908,114 | Fouse | Oct. 13, 1959 |